June 2, 1936.  O. H. BANKER  2,042,454
CLUTCH MECHANISM
Original Filed March 19, 1932   3 Sheets-Sheet 1
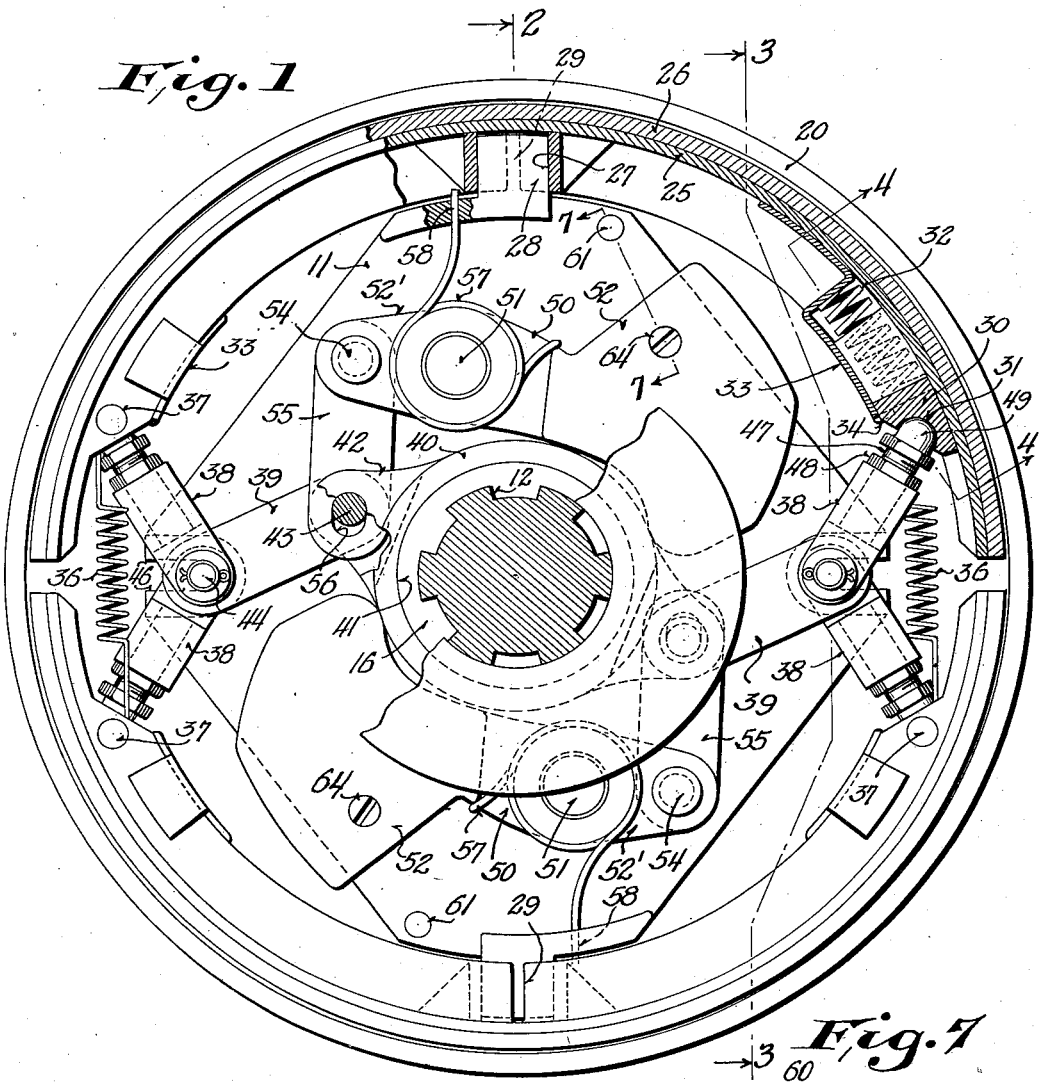
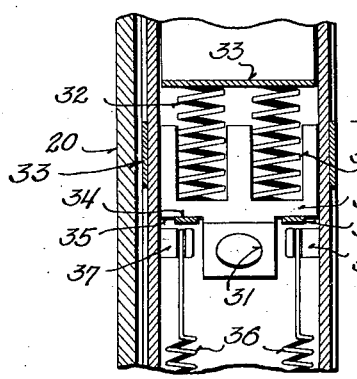
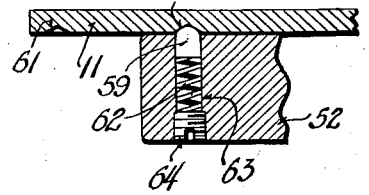
Inventor
Oscar H. Banker
By Charles F. French
Attorneys June 2, 1936.　　　　O. H. BANKER　　　　2,042,454
CLUTCH MECHANISM
Original Filed March 19, 1932　　　3 Sheets-Sheet 2
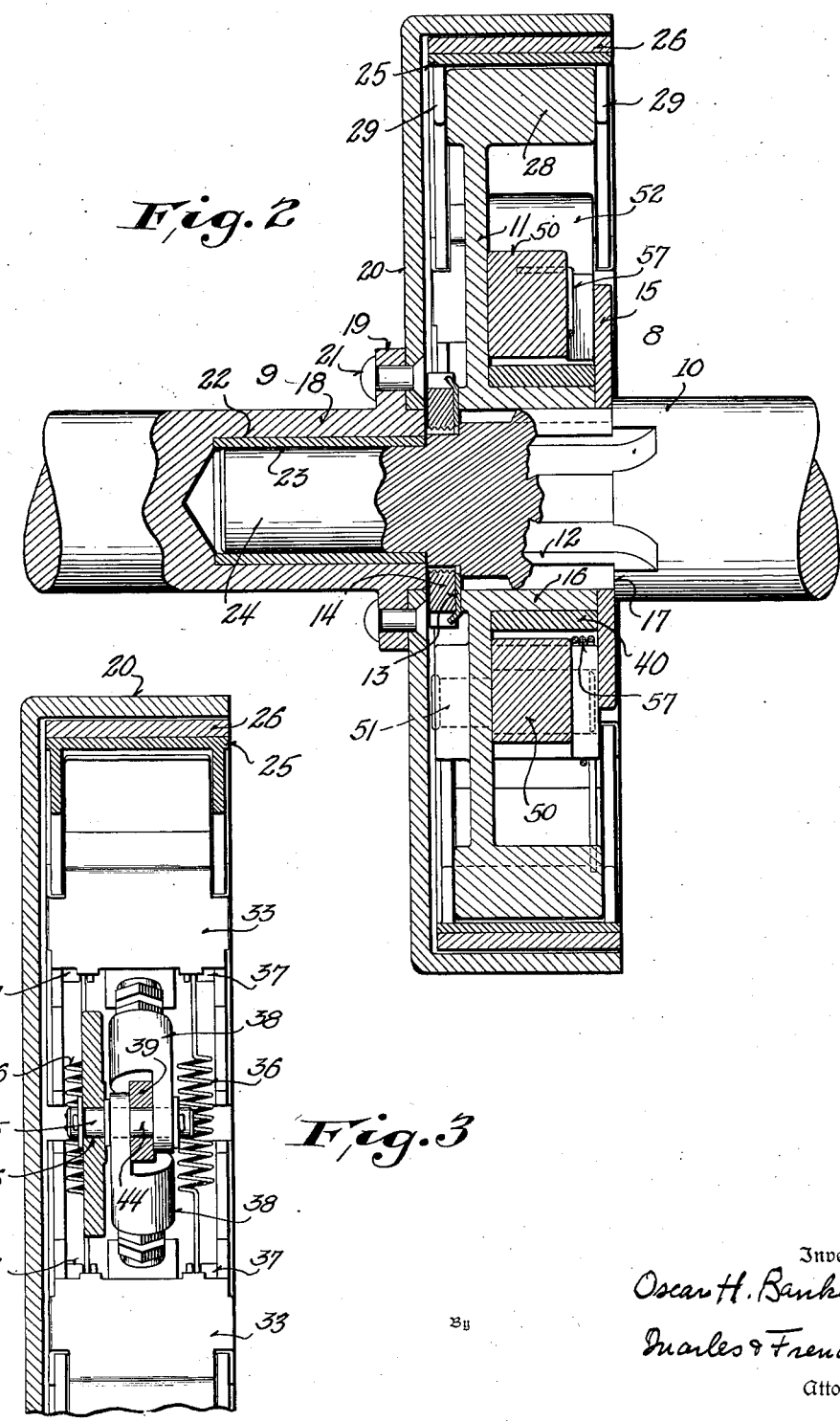

June 2, 1936.  O. H. BANKER  2,042,454
CLUTCH MECHANISM
Original Filed March 19, 1932  3 Sheets-Sheet 3
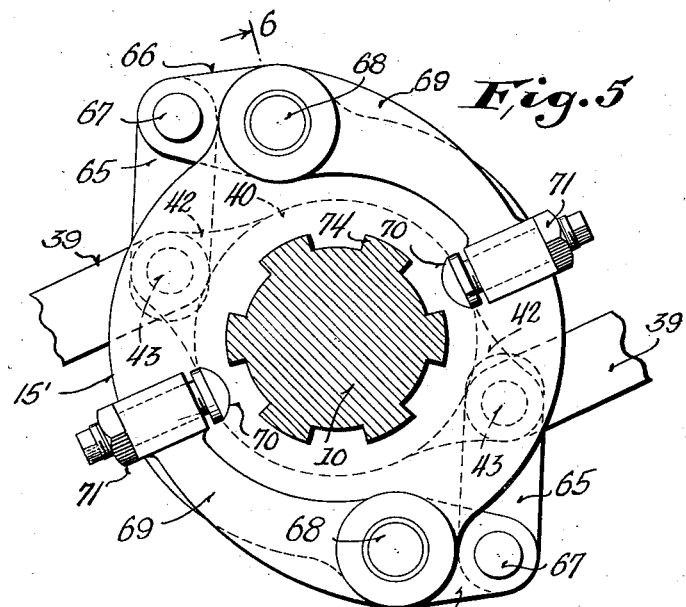
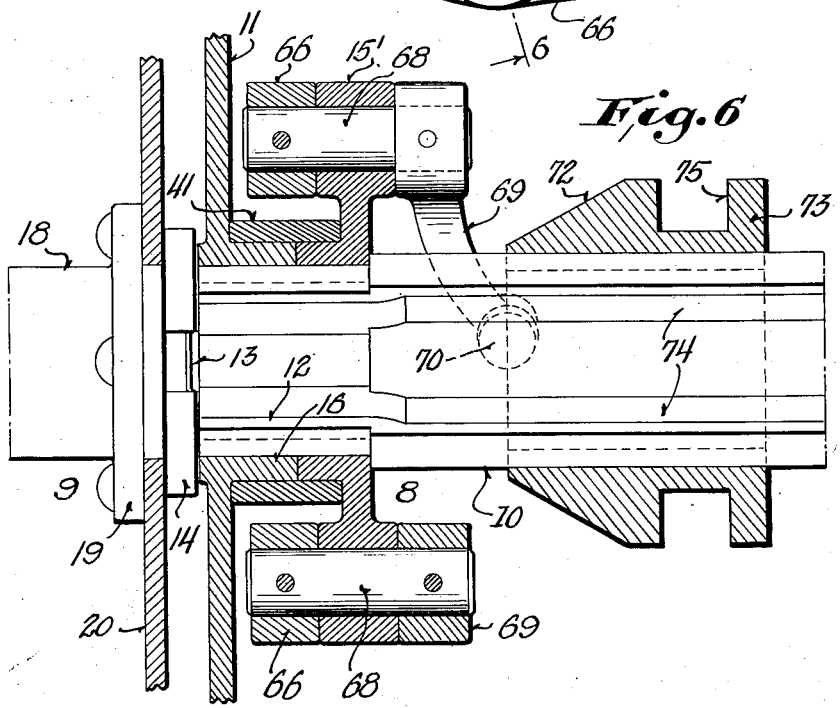
Inventor
Oscar H. Banker
By Quarles & French
Attorneys Patented June 2, 1936

2,042,454

UNITED STATES PATENT OFFICE 2,042,454

CLUTCH MECHANISM

Oscar H. Banker, Chicago, Ill., assignor to New Products Corporation, Chicago, Ill., a corporation of Delaware Application March 19, 1932, Serial No. 599,896
Renewed April 5, 1934

9 Claims. (Cl. 192—105)

The invention relates to clutch mechanism.

One of the most important objects of the present invention is to provide a clutch mechanism in which the clutch elements are held in clutched engagement with the part to be driven under a definite predetermined force regardless of an excess force that might be available through the actuating mechanism for these elements so that the maximum clutching effort does not exceed a certain amount.

A further object of the invention is to provide a clutch mechanism wherein the clutch elements are moved into clutched engagement through the powerful action of a pair of double toggles.

A further object of the invention is to provide a clutch construction smooth in action and non-chattering.

A further object of the invention is to provide a clutch mechanism of the automatic or speed responsive type wherein the speed responsive elements act upon double toggle mechanism to actuate the clutch elements and said speed responsive elements have a lost motion connection with said toggle mechanism for purposes more fully hereinafter described.

The invention further consists in the several features hereinafter set forth and more particularly defined by claims at the conclusion hereof.

Referring to the drawings:

Fig. 1 is an elevation view of clutch mechanism embodying the invention, parts being broken away and parts being shown in section;

Fig. 2 is a detail sectional view taken on the line 2—2 of Fig. 1;

Fig. 3 is a detail sectional view taken on the line 3—3 of Fig. 1;

Fig. 4 is a detail sectional view taken on the line 4—4 of Fig. 1;

Fig. 5 is a detail elevation view of certain of the parts showing certain modifications;

Fig. 6 is a detail sectional view taken on the line 6—6 of Fig. 5;

Fig. 7 is a detail sectional view taken on the line 7—7 of Fig. 1.

Referring to the drawings, the numerals 8 and 9 designate generally the parts to be clutched together and in the present instance the part 8 is the driving member and the part 9 the driven member. The part 8 includes the shaft 10 and the support 11 secured to rotate therewith by the splined connection 12, said support being held against longitudinal movement on the shaft 10 by a lock washer 13 keyed to said shaft and a nut 14 having threaded engagement with said shaft, there being also a retainer disk 15 interposed between the hub 16 of the support 11 and a shoulder 17 on the shaft 10.

The part 9 includes the shaft 18 having a flange 19 to which the clutch drum 20 is secured as by rivets 21, said shaft having a bore 22 provided with a bushing 23 into which the end 24 of reduced diameter of the shaft 10 projects and has a bearing.

Clutch elements 25 in the form of semi-cylindrical shoes are provided with a suitable lining 26 and are generally channel shaped in cross section with rectangular pockets 27 formed centrally thereof to receive guide block extensions 28 formed as a part of the support 11, the flanges or sides of the channel at the centers of the shoes being slotted as indicated at 29 to provide for some resiliency or flexing of the shoes.

Mounted at each end of each shoe is a thrust block 30 having a spherically curved socket 31 and backed by a relatively heavy spring 32 which permits relative movement between the block and the shoe after a certain predetermined pressure has been applied to the shoe through the block, the spring being mounted in a housing formed between the shoe and a casing member 33 which also is provided with inwardly extending stop projections 34 that engage shoulders 35 on the blocks whereby the springs acting against the blocks are put under a predetermined initial compression pressure. These casing members 33 may be welded or otherwise suitably secured to the end portion of the shoes.

The shoes 25 are held in a release position by the sets of release springs 36, each of the springs of each set being anchored at its ends to pins 37 secured in the flanges of the end portions of the shoes as shown more in detail in Fig. 4.

The shoes are moved into clutched engagement with the drum by a double toggle mechanism acting respectively on the ends of the shoes. Each double toggle includes a toggle formed by sets of links 38 and a toggle formed by the link 39 and a link 40. The link 40 is in the form of an equalizer member having its hub 41 mounted to rotate on the hub 16 of the support 11 and provided with diametrically disposed forked arms 42 pivotally connected by the pins 43 to one of the ends of the links 39. The other end of each of the links 39 is operatively connected or pivoted to the inner ends of each set of links 38 by a pin 44 which has an extension 45 slidably mounted in a guide slot 46 in the support 11. The outer ends of each of the links 38 has a thrust bolt 47 in threaded engagement therewith and held in adjusted position by a lock nut 48 and provided with a spherically curved head 49 adapted to seat in the socket 31 formed in the adjacent thrust block.

From the above described construction it will be noted that when a force is applied to the joints between each of the sets of links 39 and 40 tending to move these links to an alined position that a thrust will be imparted to the pivots between each of the sets of links 38 tending to move these links to an alined position and causing the pins 44 to travel outwardly in the slots 46 and that as a result of the combined action of each of the toggles, the bolts 47 will act through the blocks 30 upon each of the ends of the shoes and thus bodily move the shoes or clutch elements 25 into engagement with the drum 20 and thus produce a driving connection between the shafts 10 and 18 through the support 11, shoes 25, and drum 20, the extent of clutching pressure being governed by the pressure of the springs 32 which permit relative movement between the blocks 30 and the shoes after a certain pressure has been applied to the shoes by the toggles through these blocks.

As shown in Figs. 1 and 3 where the toggles are operated by speed responsive elements, the numeral 50 designates in each instance a lever pivotally mounted on a pin 51 on the support 11 and having a weighted end 52 and a shorter arm 52' pivotally connected by a pin 54 to a link 55 which is operatively connected at its other end to the pin 43 preferably by a lost motion connection therewith through the slot 56 in said link.

The levers 50 are moved to release position in each instance by a coiled torsion spring 57 anchored at one end 58 to the support 11 and engaging the weighted arm 52 on its other end. The weight of lever 50 is, under certain conditions of use, in each instance, prevented from hunting by a spring pressed detent, shown in Fig. 7 as a detent 59 engageable in recesses 60 and 61 in the support 11 and releasably held in either of its positions by a spring 62 mounted in a bore 63 and backed by a plug 64 in threaded engagement with said bore. These detents provide sufficient resistance to the outward movement of the weights so that they will fly out or be released as the case may be, with a definite and positive snap action. Thus when a predetermined speed of rotation of the shaft 10 has been reached, centrifugal forces acting on the weights or levers 50 will release the detents 59 from engagement with the recesses 60 and the weights will move outwardly to an expanded position. The initial movement of the weighted levers 50 to expanded position causes the links 55 to engage the pins 43 and act to apply the toggles as previously described. In reaching their maximum expanded condition the weights nest within the shoes and the detents 59 engage in the recesses 61 to restrain the weights from hunting. It is also to be noted that the arrangement of the links 39 and 40 is such that these links have substantially a straight line position when they are in applied or clutching position. Consequently, under these conditions the back pressure exerted by the springs 32 and blocks 30 on the toggles 38 has practically no reaction on the weighted lever 50 through the toggles 39, and 40. Therefore, the lost motion connection afforded by slot 56 permits the weight to fluctuate some without having its maximum locked position in order to hold the clutch in clutched position. The length of this slot in practice is limited to about one half the total travel of the link 55. Furthermore because of this arrangement only the pressure of the spring 57 needs to be overcome for the release. Where the weights are held by the detents 59 in expanded position, the lost motion connection again is of advantage as it permits of the initial release of the detents 59 from the recesses 61 before the weighted levers 50 move to a position so that link 55 can break the toggle joint between links 39 and 40. Thus this lost motion connection permits the full action of the weight release spring on its weight to release it from its plunger and then impart enough momentum to break the toggle joints of the clutch applying mechanism from their straight line position.

For manual operation the means for operating the toggles may be arranged as shown in Figs. 5 and 6 wherein the links 65, corresponding to the links 55 are connected by the pivots 43 to the toggle links 39 and 40 at one end and to the lever arms 66 by pivot pins 67 at their other ends. Each lever arm 66 is secured to a shaft 68 pivotally mounted on a support 15' which in the present instance has a hub portion splined to the shaft 10 as shown in Fig. 6. A crank arm 69 is carried on the exposed end of each shaft 68 and is provided with a thrust finger 70 in the form of a conically headed bolt adjustably mounted in the free end of each arm and secured in adjusted position by a lock nut 71, said fingers adapted to engage the cone 72 formed as a part of the shift collar 73 having a slidably splined connection with the splines 74 on the shaft 10 and provided with an annular groove 75 for engagement with any suitable shifting fork. Thus when the collar 73 is moved toward the left as viewed in Fig. 6, the arms 69 are swung outwardly, thus causing the arms 66 to move the links 65 so as to tend to aline the toggle links 39 and 40 and through them to act upon the links 38 to apply the clutch shoes 25 to the drum 20, it being noted that in this modified form there is no lost motion provided between the links 66 and the pivots 43.

In each of the forms above described it will be noted that the clutch elements will only exert a predetermined force determined by the springs 32 regardless of excess force that might be available to operate the toggle linkage mechanism that moves said shoes into clutching engagement with the drum 20.

It is also to be noted that the yieldable mounting of the blocks 30 permits of an automatic take-up for wear in the friction lining. The preloading spring pressure of the springs 32 is such as to give the full load torque capacity for which the clutch is particularly designed even though the travel of the blocks 30 may become less by the constant use of the clutch.

It is also to be noted from the drawings that the clutch shoes are not normally of the same circular contour as the interior of the drum and as a result, during an application the central part of each of the shoes first engages the drum and thereafter the ends of the shoes are swung in effect about this center of engagement into contact with the drum, the shoes being somewhat flexible, as previously noted, thus producing a gradual smooth and non-chattering engagement of the clutch elements. Furthermore, the driving of the driven member through the shoes is effected through the keys 28 and not through the toggles that operate the shoes so that there is no self energizing effect with its possible erratic grabbing and chattering action and as a result also since the toggles do not carry the driving load they may be made of simple and light construction.

I desire it to be understood that this invention is not to be limited to any particular form or arrangement of parts except in so far as such limitations are included in the claims.

What I claim as my invention is:

1. In a clutch, the combination of a rotatable drive member, a rotatable driven member, clutch shoes for connecting said members together in driving relation, a set of toggle links interposed between the ends of said shoes and adapted to move said shoes to clutch position, a second set of toggle links operatively connected to each of the first sets of toggle links to operate said first set of toggle links, and means for simultaneously applying an actuating force to the joints of each of the second sets of toggle links including speed responsive elements and a lost motion connection between said elements and said joints.

2. In a clutch, the combination of a rotatable drive member, a rotatable driven member, clutch shoes for connecting said members together in driving relation, a set of toggle links interposed between the ends of said shoes and adapted to move said shoes to clutch position, a second set of toggle links operatively connected to each of the first sets of toggle links to operate said first set of toggle links, means for simultaneously applying an actuating force to the joints of each of the second sets of toggle links including speed responsive elements and a lost motion connection between said elements and said joints, thrust blocks on said shoes with which the first set of toggle links engage, and spring means cooperating with said blocks to predetermine the amount of clutching force applied to said shoes.

3. In a clutch, the combination of a rotatable drive member, a rotatable driven member, clutch elements for connecting said members together in driving relation, double toggle linkages connected with each of said clutch elements, speed responsive means for moving one set of toggles of each linkage to actuate the other set of toggles of this linkage to apply said clutch elements, means for restraining the movement of said speed responsive means in either contracted or expanded position, said speed responsive means having lost motion connection with the above mentioned set of toggles.

4. In a clutch, the combination of a drive shaft, a driven shaft provided with a drum, a pair of oppositely disposed shoes operatively connected with said drive shaft, means for bodily moving said shoes into engagement with said drum comprising sets of toggle links and yieldingly mounted thrust members on the end portions of said shoes with which said links engage and through which they exert a certain predetermined clutching force, means for guiding the pivotal connections of each set of said toggle links in a substantially straight path, and sets of toggle links connected respectively to the first named sets of toggle links and each of said last named sets of links having pivotal connections movable to bring the links into substantial alinement with each other, and means for imparting an operating force to the second named sets of toggle links.

5. In a clutch, the combination of a rotatable drive member, a rotatable driven member, clutch elements for connecting said members together in driving relation, double toggle linkages connected with each of said clutch elements, and speed responsive means operatively connected with the jointures of one set of toggles of this linkage to apply said clutch elements.

6. In a clutch, the combination of a rotatable drive member, a rotatable driven member, clutch elements for connecting said members together in driving relation, double toggle linkages connected with each of said clutch elements, speed responsive means for moving one set of toggles of each linkage to actuate the other set of toggles of this linkage to apply said clutch elements, means for restraining the movement of said speed responsive means in expanded position, said speed responsive means having lost motion connection with the above mentioned set of toggles.

7. In a clutch, the combination of a rotatable drive member, a rotatable driven member, clutch elements for connecting said members together in driving relation, a set of toggles operatively connected with the end portions of each of the clutch elements, a second set of toggles operatively connected with the joints of the toggles of the first set and including links formed as a part of an equalizing member, and speed responsive means including pivotally mounted weighted levers operatively connected to those joints of the toggles including said equalizer.

8. In a clutch, the combination of a rotatable drive member, a rotatable driven member, clutch elements for connecting said members together in driving relation, means acting directly on said clutch elements to release the same, centrifugally operated means for applying said clutch elements including a set of toggles operatively connected with the end portions of each of the clutch elements, and a weighted member operatively connected to each set of toggles, spring means for moving said weighted members to a contracted position, said last named spring means providing the only force for the return of said weights when said clutch elements are engaged.

9. In a clutch, the combination of a rotatable drive member, a rotatable drum having a flange, clutch shoes engageable with the inner side of said flange for connecting said member and drum together in driving relation, means for releasing said clutch shoes, a set of toggles operatively connected with the end portions of each of the clutch elements to simultaneously move them into driving relation with said drum, centrifugally operated means for actuating said toggles, and means providing for the release of said clutch shoes at a lower speed than they are engaged.

OSCAR H. BANKER.